(12) United States Patent
Hart

(10) Patent No.: US 11,823,041 B1
(45) Date of Patent: Nov. 21, 2023

(54) EXTENDING LEARNING OF ARTIFICIAL INTELLIGENT SYSTEMS

(71) Applicant: Alarm.com Incorporated, Tysons, VA (US)

(72) Inventor: Jacob Hart, Arlington, VA (US)

(73) Assignee: Alarm.com Incorporated, Tysons, VA (US)

(*) Notice: Subject to any disclaimer, the term of this patent is extended or adjusted under 35 U.S.C. 154(b) by 1120 days.

(21) Appl. No.: 16/553,784

(22) Filed: Aug. 28, 2019

Related U.S. Application Data

(60) Provisional application No. 62/724,980, filed on Aug. 30, 2018.

(51) Int. Cl.
 *G06N 3/08* (2023.01)
 *G06F 16/33* (2019.01)
 *G06Q 30/016* (2023.01)

(52) U.S. Cl.
 CPC ........... *G06N 3/08* (2013.01); *G06F 16/3347* (2019.01); *G06Q 30/016* (2013.01)

(58) Field of Classification Search
 CPC ..... G06N 3/08; G06F 16/3347; G06Q 30/016
 See application file for complete search history.

(56) References Cited

U.S. PATENT DOCUMENTS

| 7,921,068 | B2 | 4/2011 | Guyon et al. |
| 8,291,319 | B2 | 10/2012 | Li et al. |
| 2016/0155049 | A1 | 6/2016 | Choi |
| 2018/0240013 | A1* | 8/2018 | Strope ............... G06N 5/04 |

FOREIGN PATENT DOCUMENTS

| CA | 2716432 A1 * | 9/2009 | ............ G06F 16/21 |
| CA | 3039759 A1 * | 3/2018 | ............... G06F 7/02 |

* cited by examiner

*Primary Examiner* — Hosain T Alam
*Assistant Examiner* — Anthony G Gemignani
(74) *Attorney, Agent, or Firm* — Fish & Richardson P.C.

(57) ABSTRACT

Methods, systems, and apparatus for extended training data sets for neural network-based IT solutions. In one aspect, a method includes collecting, support data generated during multiple support events including a corpus of articles referenced during the support event. Within the corpus of articles, restricted and unrestricted articles referenced in the support data and restricted and unrestricted articles not referenced in the support data are identified. Embedded vectors are generated for each article that is referenced in the support data from the article and a subset of the support data that references the article, and for each article that is not referenced by the support data, an embedded vector from only the article. A dimensionality of the embedded vectors is reduced and a neural network is trained using the embedded vectors to select a particular article of the corpus of articles responsive to a new support event.

20 Claims, 4 Drawing Sheets

EXTENDING LEARNING OF ARTIFICIAL INTELLIGENT SYSTEMS

CROSS-REFERENCE TO RELATED APPLICATIONS

This application claims benefit to U.S. Provisional Application Ser. No. 62/724,980, filed on Aug. 30, 2018, which is incorporated by reference herein.

TECHNICAL FIELD

This disclosure application relates generally to artificial intelligence.

BACKGROUND

Automated systems can recommend information technology (IT) solution content to querying users. Users can be provided with IT solution content responsive to a stated problem, where IT solution content can be selected by an automated system based on previously resolved IT solution support events.

SUMMARY

Techniques are described for extended training data sets for neural network-based IT solutions. A neural network is trained using a set of IT solution articles and IT support data that is generated by IT support experts during IT support events. The IT support data can reference a set of IT solution articles used by the human IT support expert to solve a set of IT problems. IT solution articles (e.g., manufacturer manuals, standard operating procedures, troubleshooting guides, etc.), including a set of internal articles (e.g., limited access to IT support experts) and a set of external articles (e.g., open access to general public), can be pre-processed to generate vectorized articles including an embedded vector for each article where the vectors generated for the set of internal articles and the set of external articles are embedded into a same space. The neural network can select, using the embedded vectors referencing each article, a set of internal and/or external articles to provide in response to a user query, where the user query includes a problem that the user is experiencing (e.g., a IT problem) and the selected article (s) can provide a solution responsive to the problem. An extended training set including articles referenced by IT support data (e.g., internal articles) and articles not referenced by IT support data (e.g., external articles) are selectable by the neural network to provide to the user as a solution to the user's query. Articles selected by the neural network to provide responsive to the user query can be filtered by a security filter such that querying users are provided with articles that are responsive to the user query and are appropriate for the user's security credentials.

In general, one innovative aspect of the subject matter described in this specification can be embodied in methods that include collecting, for each support event of multiple support events, support data generated during the support event including one or more articles of a corpus of articles referenced during the support event. Within the corpus of articles, one or more of (i) restricted articles and (ii) unrestricted articles referenced in the support data and one or more of restricted articles and unrestricted articles not referenced in the support data are identified, where the restricted articles include articles accessible by only a subset of users of multiple users and the unrestricted articles include articles accessible by the multiple users. Multiple embedded vectors are generated by generating, for each restricted article and unrestricted article of the corpus of articles that is referenced in the support data, an embedded vector from the article and a subset of the support data that references the article, and generating, for each restricted article and unrestricted article of the corpus of articles that is not referenced by the support data, an embedded vector from only the article. A dimensionality of the embedded vectors is reduced, and, using the plurality of embedded vectors, a neural network is trained to select a particular article of the corpus of articles responsive to a new support event. Other embodiments of this aspect include corresponding systems, apparatus, and computer programs, configured to perform the actions of the methods, encoded on computer storage devices.

These and other embodiments can each optionally include one or more of the following features. In some implementations, the one or more articles of the corpus of articles are referenced by a human expert during the support event. The support data can further include structured data provided by the human expert during the support event. The particular embedded vector can correspond to one or more articles of the corpus of articles utilized by the human expert to provide a solution responsive to the particular problem query.

In some implementations, training the neural networks further includes providing multiple problem queries that each correspond to a respective embedded vector of the multiple embedded vectors. Training the neural networks can include minimizing an angle between an output vector generated for a respective problem query and the respective embedded vector of the multiple embedded vectors.

In some implementations, generating the embedded vector includes using term frequency-inverse document frequency (TF-IDF) to generate the embedded vector by extracting, from the article and the subset of support data referencing the article, structured data to create a dictionary of words appearing in the structured data. Generating the embedded vector can further include selecting a set of words from the dictionary of words appearing in the structured data that appear in the structured data at a frequency below a threshold frequency with respect to structured data extracted from the corpus of articles and the support data referencing the corpus of articles, and assigning respective word scores for each word of the set of words based on a frequency that the word appears in the article relative to the corpus of articles. Processing each embedded vector to reduce the dimensionality of the embedded vector can include using principal component analysis.

In some implementations, an embedded vector includes a mapping from discrete objects including words to vectors of real numbers.

In general, another innovative aspect of the subject matter described in this specification can be embodied in methods for providing support solution content that include receiving, from a user, a query comprising one or more terms. Neural networks can be used to select one or more articles responsive to the query, including receiving, by the neural networks, the one or more terms of the query, generating, by the neural networks, an output vector from the one or more terms of the query, the output vector having a same dimensionality as a plurality of embedded vectors, where each embedded vector of the multiple embedded vectors corresponds to one or more articles of a corpus of articles, and selecting one or more embedded vectors of the multiple embedded vectors responsive to the output vector that have respective smallest distances in measured angle between each of the one or more embedded vectors and the output vector. The one or more articles responsive to the query are filtered to generate a filtered set of articles, and the filtered set of articles are provided to the user as recommended articles responsive to the query. Other embodiments of this aspect include corresponding systems, apparatus, and computer programs, configured to perform the actions of the methods, encoded on computer storage devices.

These and other embodiments can each optionally include one or more of the following features. In some implementations, filtering the one or more articles to generate the filtered set of articles includes comparing a level of access granted by security credentials for the user to a corresponding level of accessibility for each article of the one or more articles responsive to the query.

In some implementations, the methods further include receiving feedback from the user responsive to an article of the provided filtered set of articles and determining, based on the user feedback, that the article was a correct article responsive to the user query, and in response, increase a relative score of the embedded vector for the article for the query.

In some implementations, the methods further include generating new training data for the neural network utilizing one or more of the feedback from the user, the article of the provided filtered set of articles, and the user query.

In some implementations, at least one embedded vector of the multiple embedded vectors corresponds to an article of the corpus of articles, where the article is not referenced by support data for a plurality of support events. Each embedded vector of the multiple embedded vectors can further correspond to a subset of support data referencing the one or more articles of the corpus of articles. Each embedded vector of the multiple embedded vectors can be compressed to reduce a dimensionality of the embedded vector.

In general, another innovative aspect of the subject matter described in this specification can be embodied in systems including one or more sensors of a home monitoring system and a data processing apparatus in data communication with the one or more sensors of the home monitoring system and that is operable to perform the operations including: providing, to neural networks, a query related to the one or more sensors of the home monitoring system including one or more terms. The neural networks select one or more articles responsive to the query by receiving the one or more terms of the query and generating an output vector from the one or more terms of the query, where the output vector has a same dimensionality as a set of multiple embedded vectors, where each embedded vector of the multiple embedded vectors corresponds to one or more articles of a corpus of articles. One or more embedded vectors of the multiple embedded vectors are selected as responsive to the output vector that have respective smallest distances in measured angle between each of the one or more embedded vectors and the output vector. The one or more articles responsive to the query are filtered to generate a filtered set of articles, and the filtered set of articles is provided to the user as recommended articles responsive to the query. Other embodiments of this aspect include corresponding computer programs, configured to perform the actions of the methods, encoded on computer storage devices.

Particular embodiments of the subject matter described in this specification may be implemented so as to realize one or more of the following advantages. Articles that are not referenced by IT support data (e.g., external articles, new internal/external articles) are embedded with a same dimensional vector into a single space as articles that are referenced by IT support data, such that a neural network can select articles that did not appear in an original training set and for which no IT support data exists, thus increasing the set of articles that are recommendable by the neural network. Using the extended training data set, the neural network can learn which articles solve a particular IT problem rather than performing keyword matching, thus improving the recommendations provided by the neural network. Rather than treating each article as a separate entity, articles with embedded vectors can be clustered together based on similarities between the respective embedded vectors of the articles. Training of the neural networks can be performed faster, with increased accuracy, and articles that the neural network has never been trained on can be recommended. Use of term frequency-inverse document frequency and principal component analysis optimizes a compression vs. loss ratio for generating and compressing embedded vectors.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Techniques are described for extended training data sets for neural network-based IT solutions.

Figure 1:
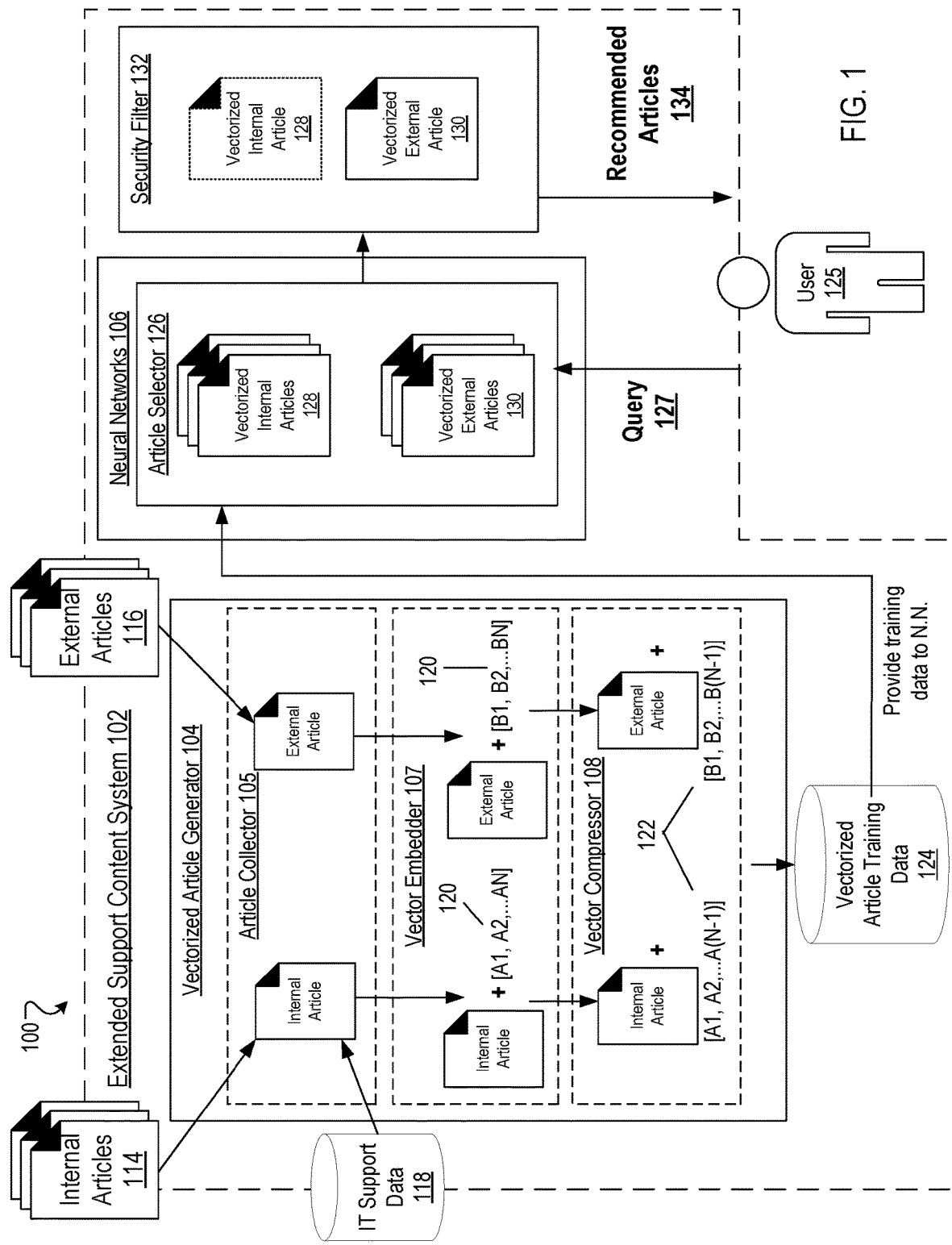
FIG. 1 is an example operating environment for an extended support content system.

FIG. 1 is an example operating environment 100 for an extended support content system 102. Extended support content system 102 can be hosted on one or more local servers, a cloud-based service, or a combination thereof. The extended support content system 102 includes a vectorized article generator 104 and one or more neural networks 106.

Extended support content system 102 can be in data communication with a network where the network can be configured to enable exchange of electronic communication between devices connected to the network. The network can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. The network may include multiple networks or subnetworks, each of which may include, for example, a wired or wireless data pathway. The network may include a circuit-switched network, a packet-switched data network, or any other network able to carry electronic communications (e.g., data or voice communications). For example, the network may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network may include one or more networks that include wireless data channels and wireless voice channels. The network may be a wireless network, a broadband network, or a combination of networks includes a wireless network and a broadband network.

Vectorized article generator 104 includes an article collector module 105, a vector embedder module 107, and a vector compressor module 108. Though described herein as an article collector module 105, a vector embedder module 107, and a vector compressor module 108, the different operations of the vectorized article generator 104 may be performed by more or fewer sub-systems within the vectorized article generator 104.

The article collector module 105 can receive internal articles 114 and external articles 116. The internal articles 114 and external articles 116 can be stored on a local server, a cloud-based server, or a combination thereof. An internal article 114 is a restricted article such that only a subset of users (e.g., company employees) can view the content of the restricted article. An internal article 114 can be, for example, a company internal manual, standard operating procedures, a troubleshooting guide, or other operational information. Internal articles 114 can contain confidential and/or non-public information, for example, inner-workings of a piece of hardware or trade secret software.

An external article 116 is an unrestricted article such that all users (e.g., dealers, technicians, and customers) can view the content of the unrestricted article. An external article 116 can be, for example, a manufacturer's manual or other operational information. External articles can be articles published by third-parties, for example, a manufacturer of a piece of equipment or another service entity (e.g., an internet service provider).

In some implementations, an internal article 114 and an external article 116 can contain similar information but are not the same article. In one example, an external article 116 can be a manufacturer's manual for a device and an internal article 114 can include the manufacturer's manual and additionally contain company-specific notes related to troubleshooting operations for the device.

The article collector module 105 can additionally receive IT support data 118. IT support data 118 is collected by a human IT support expert during an IT support event. An IT support event can include a request from a user for a solution related to a problem. The IT support data 118 collected can include notes/comments from the human IT support expert detailing the problem and one or more steps taken to solve the problem. The IT support data 118 can reference content from one or more internal articles 114 and/or external articles 116 used by the IT support expert during the IT support event, where the reference can be, for example, a uniform resource locator (URL) for the internal article, a hyperlink to the internal article, an identification tag for the internal article, or the like. In one example, IT support data 118 are notes taken by an IT support expert during an IT support event, e.g., a technician who is troubleshooting a malfunctioning home monitoring system. The notes taken by the IT support expert can include an order of troubleshooting steps suggested by the IT support expert to the technician to diagnose and resolve the issue, expanded details about the problem and solution, and the like. Notes can be, for example, "technician is experiencing a loss of connectivity between Device A and the home network over a Wi-Fi connection," "technician was instructed to restart Device A," "technician was instructed to check cable connection between network box and Wi-Fi router," and "connectivity was restored by swapping out a faulty cable between network box and Wi-Fi router." The IT support data 118 can include references to one or more internal articles 114 that the IT support expert used during the IT support event, for example, an internal manual for a piece of equipment that is determined to be malfunctioning, a standard operating procedures guide for troubleshooting the home monitoring system, or the like. The IT support data 118 can include references to one or more external articles 116 that the IT support expert used during the IT support event, for example, a manufacturer's manual for a piece of equipment (e.g., the Wi-Fi router manual, Device A manual) that is determined to be malfunctioning.

In some implementations, an IT support data array can be generated from the IT support data 118 for each IT support event, including a first column and a second column. The first column of the IT support data array can include one or more URLs, each URL referencing an internal article, that are extracted from the IT support data 118 for the IT support event. The second column of the IT support data array can include structured data (e.g., notes/comments) extracted from the IT support data 118 for the IT support event, and not including the URLs included in the IT support data 118. For example, a first column of the IT support data array can include URL reference "www.example.com/ITsupport/internal/home network connectivity troubleshooting guide" and a notes "technician is experiencing a loss of connectivity between Device A and the home network over a Wi-Fi connection," and "connectivity was restored by swapping out a faulty cable between network box and Wi-Fi router." In another example, a first column of the IT support data array can include URL reference is "www.example.com/ITsupport/external/Device_A_manual" and notes "technician is experiencing a loss of connectivity between Device A and the home network over a Wi-Fi connection," and "connectivity was restored by cycling power on Device A."

The IT support data array can be used during the training phase of the neural networks 106 to generate output vectors representing problems and articles provided as solutions during IT support events. For example, a neural network can be trained to associate a problem (e.g., "technician is experiencing a loss of connectivity between Device A and the home network over a Wi-Fi connection") with one or more internal/external articles (e.g., a troubleshooting manual referenced by URL "www.example.com/ITsupport/internal/home_network_connectivity_troubleshooting_guide") and one or more notes from the IT support data (e.g., "technician was instructed to check cable connection between network box and Wi-Fi router," and "connectivity was restored by swapping out a faulty cable between network box and Wi-Fi router.") such that the neural networks may provide the specific internal/external article responsive to receiving an output vector representing a problem that is determined to be similar to the problem "technician is experiencing a loss of connectivity between Device A and the home network over a Wi-Fi connection." Further details of the training phase of the neural networks 106 is described below with reference to FIG. 2.

In some implementations, a set of internal articles 114 and/or a set of external articles 116 collected by the article collector 108 do not have associated IT support data 118. For example, an external article 116 that has not be used by IT support expert during IT support events may not have associated IT support data 118 (e.g., notes from a call between an IT support expert and a technician). In another example, an internal article 114 can be a newly generated article (e.g., new procedure or new piece of equipment) such that it has not been used by IT support expert during IT support events and does not have associated IT support data 118 as result.

Vector embedder module 107 generates a vector 120 for each internal article 114 and each external article 116, for example, a vector [A1, A2, . . . AN]. In some implementations, embedded vectors for articles can be generated such that a distance in between respective articles is proportional or approximately proportional to a difference in problems that each respective article resolves. The embedded vectors for articles can represent the distance in space, where each component of the vector represents a key aspect of the article, the details of which are inputs to a neural network and do not need to be in a format that is readable by a human expert. Generating an embedded vector includes generating a mapping of discrete objects to vectors of real numbers, e.g., mapping words to vectors of real numbers. Generation of vector 120 is described in more detail with reference to FIG. 2 below.

Vector compression module 108 compresses vectors 120 for respective internal article 114 and external article 116 to generate a compressed vector 122, for example, vector [A1, A2 . . . A(N−1)]. Compressed vector 122 has a reduced number of dimensions when compared to vector 120. For example, a vector 120 can be a 3000 dimension vector and a compressed vector 122 can be a 700 dimension vector. The compression of vector 120 to generate compressed vector 122 is described in more detail with reference to FIG. 2 below. The compressed vectors 122 for respective internal article 114 or external article 116 in which each compressed vector 122 is embedded form vectorized article training data 124.

Neural networks 106 includes an article selector module 126. Neural networks can be, for example, a convolutional neural network, a fully connected neural network, a recurrent neural network, or a variant/combination thereof. Neural networks 106 can include a training phase, e.g., where the neural network 106 is trained using supervised learning and training data 124, and an inference phase, e.g., where the neural network can receive a user-provided query 127 from a user 125 and select one or more vectorized internal articles 128 and/or one or more vectorized external articles 130 by the article selector 126. Further details of the training process for the neural network 106 and article selection process are described below with reference to FIGS. 2 and 3.

A security filter 132 can be an authentication of a user's 125 security credentials and comparing a level of access granted by the user's 125 security credentials to a level of accessibility for each vectorized article selected by the neural network 106 as a recommended article 134. A user's 125 security credentials can depend in part of a type of user that is the user 125 (e.g., an internal employee, a customer, a support technician, etc.). Security filter 132 can process the selected vectorized internal articles 128 and vectorized external articles 130 to determine which of the selected vectorized articles can be provided to user 125 as recommended articles 134.

In some implementations, the neural network 106 produces a ranked list of articles 128, 130 based on the articles' ability to solve the user query 127. The ranked list is then filtered by the user's 125 permissions and security settings of each of the selected articles by the security filter 132. The security settings for each article are contained, for example, in the article database (e.g., internal articles 114, external articles 116). A set of top results of the final list are provided to the user 125.

In some implementations, internal users have a first level of assigned access (e.g., can view internal 128 and external 130 articles), and external users have a second level of assigned access (e.g., can only view vectorized external articles 130). In some implementations, multiple different levels of access can be assigned to internal users (e.g., a junior employee vs. a senior level executive), and multiple different levels of access can be assigned to external users (e.g., contract-employed technician vs. an end-user).

Figure 2:
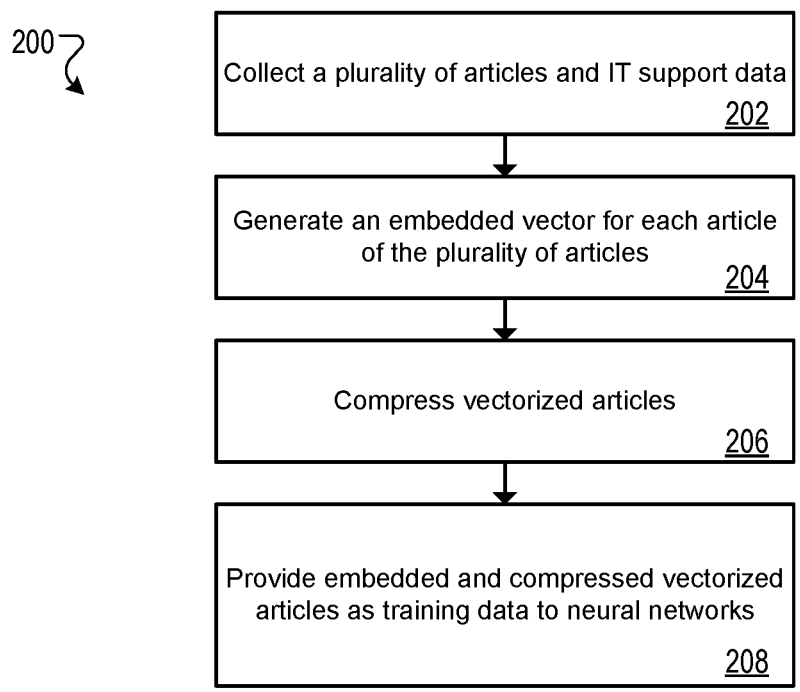
FIG. 2 is a flow diagram of an example process for generating extended learning data for a neural network.

FIG. 2 is a flow diagram of an example process 200 for generating extending learning data for a neural network 106. A corpus of articles and IT support data 118 are selected (202). IT support data can be generated during multiple support events, where each support event can generate respective support data including one or more articles of the corpus of articles that are referenced during the event. A corpus of articles can include internal articles 114 and external articles 116. Internal articles 114, or restricted articles, can include articles that are accessible only by a subset of users (e.g., IT support personnel). External articles 116, or unrestricted articles, can include articles that accessible by a set of users, e.g., general public and IT support personnel.

In some implementations, the corpus of articles includes at least one restricted article referenced in the support data 118 and a set of restricted and/or unrestricted articles not referenced in the IT support data 118. For example, the corpus of articles can include a set of internal manuals that are referenced in the support data 118 and a set of external resources (e.g., webpages, open-access journals, public support forums) that are not referenced in the support data 118. Additionally, the corpus of articles can include a set of internal manuals that have not yet been referenced in the support data 118, e.g., newly edited or newly generated manuals that have not yet gone into internal distribution for IT support events.

IT support data 118 can include, for example, data collected by IT support experts during an IT support event including a description of the problem, notes by the IT support experts, and internal articles 114 used to solve the problem. An embedded vector is generated for each article in the plurality of articles (204).

In some implementations, embedded vectors are generated for each restricted article of the corpus of articles that is referenced in the support data from restricted the article and a subset of the support data that references the article, and embedded vectors are generated for each restricted article and unrestricted article of the corpus of articles that is not referenced by the support data from only the article. Each of the embedded vectors that is generated, for both restricted articles referenced in the support data and articles not referenced in the support data, are of a same dimensionality.

In some implementations, vectorized articles are generated, for example, using term frequency-inverse document frequency (TF-IDF). TF-IDF can be used to generate the vectorized articles by extracting, for a corpus of internal articles 114 and external articles 116, the structured data from each article to create a dictionary of all words appearing in the structured data. High frequency words (e.g., words that appear with a frequency above a threshold frequency) in a threshold number of the articles in the set of articles can be discarded. For example, high frequency words can include "the," "from," and "that." Each remaining word (e.g., words that appear with a frequency below the threshold frequency) can be assigned a word score, where each article of the set of articles has a set of words and respective assigned word scores. The word score for each word in a particular article (e.g., an internal article or an external article) can be based on a frequency that the word appears in the particular article relative to the corpus of articles. For example, a word "connectivity" can appear in a particular troubleshooting manual that is directed to network connectivity issues more frequently with respect to the corpus of articles such that a word score for "connectivity" can be a higher score relative to a different word that appears less frequently in the particular troubleshooting manual directed to network connectivity, e.g., a word score for "security." The vectorized articles can be clustered together based on similarities of the content of respective articles.

The set of words for an article that appear with a frequency below a threshold frequency with respect to the corpus and respective word scores for each word of the set of words for an article can be used to generate an embedded vector 120 for the article. The embedded vector 120 for an article includes all the words for the article that appear in the structured data for the corpus at a frequency that is below a threshold frequency, and additionally includes the respective word scores for each of the words included in the embedded vector 120. For example, words such as "as," "the," or "solution" may appear at a frequency in the corpus that is above a threshold frequency and are not included in an embedded vector generated for an article that includes the words in its structured data. In another example words such as "Wi-Fi," "network connectivity," or "power" may appear at a frequency in the corpus that is below the threshold frequency and are included in the embedded vector generated for an article that includes the words "Wi-Fi," "network connectivity," or "power" in its structured data.

The vectorized articles are compressed (206). In some implementations, a generated vector 120 can be compressed by reducing the dimensionality of the vector 120 using, for example, principle component analysis (PCA). PCA is used to reduce the dimensionality of the vector while minimizing information loss, e.g., a 4000 word vector for an article can be compressed to a 700 word vector for the article using PCA. Words in the generated vector for an article that are determined to appear together in the article at a frequency above a threshold frequency can be combined in the vector array. For example, words such as "Wi-Fi" and "network" can be determined to appear together (e.g., as an adjacent ordered pair "Wi-Fi network") in the article at a frequency above a threshold frequency and can be combined into a single dimension "Wi-Fi network.". Other compression techniques can be used in addition to, or alternatively to, PCA.

In some implementations, one or more URLs each referencing an internal article 114 in an IT support array from the IT support data 118 can be converted into a reference to a corresponding embedded and compressed vector 122 such that the first column of the IT support array includes reference to vectorized article. For example, an IT support array from the IT support data 118 representing an IT support event can contain a URL (e.g., "www.example.com/ITsupport/internal/home network connectivity troubleshooting guide") referencing an internal article 114 (e.g., "home network connectivity troubleshooting guide") that was utilized by the IT support expert to provide a solution to a user's problem (e.g., a network connectivity issue). The URL referencing the internal article 114 in the IT support array is replaced by the corresponding compressed vector 122 that is embedded in the internal article 114.

The embedded and compressed vectorized articles are provided as training data to neural networks (208). The vectorized article training data 124 generated by the vectorized article generator 104 is provided to the neural networks 106 to train the neural networks 106 using supervised learning. During a training phase, problems (e.g., sample user queries) are provided to the neural networks 106 along with the corresponding vectorized articles 122 (e.g., internal articles 114) that were used by IT support experts to provide a solution to the problem. The neural networks 106 minimize an angle (e.g., determined by a cosine distance) between the output vector generated for the problem and the embedded vector corresponding to an internal article 114 referenced by the IT support data 118 that was used by an IT support expert to provide a solution to the problem. The neural networks can be trained using the embedded vectors to select a particular article of the corpus of articles that is responsive to a new support event, as described in further detail with reference to FIG. 3.

In some implementations, a loss function or cost function can be used to calculate a loss as the angle between the output vector and the embedded vector corresponding to an internal article 114 referenced by the IT support data 118. Gradients can then be computed for the loss function and updates can be made to the neural network 106 in order to minimize the loss function.

In some implementations, the neural network 106 is provided with feedback (e.g., user 122 feedback or IT support expert feedback) on whether or not a recommended article 134 was a correct article. A correct article is an article that provides a resolution to a problem defined by a user's query 127. The feedback related to each recommendation can refine the neural network's 106 ability to recommend articles that will provide resolution to user queries 127. Feedback can be, for example, a rating given by the user (e.g., on a scale from 1 to 5), a text-based response (e.g., "my problem was resolved"), a graphical response (e.g., a "thumbs up" or "thumbs down"), or the like. The feedback can be used to produce new training data with which to update the neural networks 106.

The neural network 106 can be provided with a set of vectorized articles (e.g., vectorized internal articles 128 and vectorized external articles 130) for which no associated IT support data 118 is available. For example, an article that has not yet been provided as part of an IT support scenario. The set of vectorized articles for which no associated IT support data 118 is available can be embedded in a same space with a set of vectorized articles for which IT support data 118 exists. The neural network 106 can provide recommended articles 134 using both articles for which it has been trained using the supervised learning, and/or provide recommended articles 134 using articles for which it has not been trained, based in part on a closeness of the particular vectorized article in angle to an output vector for a provided problem, as described in more detail below with reference to FIG. 3.

Figure 3:
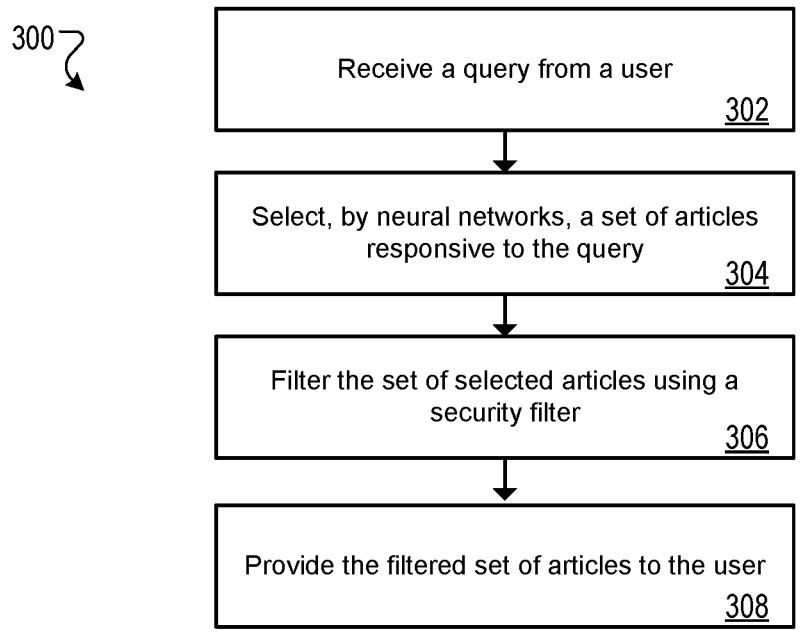
FIG. 3 is a flow diagram of an example process for providing IT support solution content to a user.

FIG. 3 is a flow diagram of an example process 300 for providing IT support solution content to a user. A query 127 is received from a user 125 (302). User 125 can be an internal or external user. Internal users are employees or otherwise unrestricted expert (e.g., customer service tech support, engineers, etc.). External users are technicians, customers, dealers, or otherwise restricted expert. Each user 125 has an assigned level of access to the internal/external articles. The assigned level of access for user 125 can be stored, for example in a user profile by the extended support content system 102.

Query 127 can include a set of statements provided by the user 125. The user 125 can input the query 127, for example, as a string of text. For example, a query 127 can be "blinking light is blue, device is unresponsive." A query 127 can additionally include information related to actions taken by the user 125 that did not resolve the problem. For example, query 127 can be "network connectivity intermittently drops, cycling power did not fix the problem." A query 127 can additionally include customer information from a user account, for example, the different devices associated with the user account. Queries 127 can be input, for example, through an online portal, an email, a SMS/text message, or in an application chat dialogue box.

The query 127 provided by the user 125 including a problem is provided to the neural networks 106 and includes a text of a user query 127. In some implementations, additional features are provided as input to the neural networks including, for example, the user's hardware or the user's account history.

A set of articles is selected by neural networks 106 that are responsive to the query (304). The neural network 106 receives as input the text of the of the user query 127 and generates an output vector of a same dimensionality as the compressed vectors 122 embedded in the vectorized internal articles 128 and vectorized external articles 130 (e.g., 700 dimensional vector). During an inference phase, (e.g., where the neural network 106 is outputting a set of vectorized articles 128, 130 responsive to a user query 127), one or more vectorized articles 128, 130 are selected responsive to the output vector that have respective smallest distances in a measured angle between respective vectors for each vectorized article 128, 130 in the set of articles and the output vector.

In some implementations, a closest measured angle is determined by a cosine distance. A list of vectorized articles can be determined and sorted, for example, from closest to farthest cosine distance to the output vector generated by the neural network 106. A set of vectorized articles can be selected from the sorted list of vectorized articles, for example, a set of the top five articles that are determined to be closest in measured angle to the output vector.

The set of selected articles are filtered using a security filter (306). The security filter 132 can determine, from permissions associated with each of the selected articles 128, 130 and an authorization of the user 125, which articles can be provided to the user 125 responsive to the user's query 127. For example, a user 125 that is an internal user (e.g., an employee of the IT service provider) can have access to internal articles 128 and external articles 130. In another example, a user 125 is a customer or an onsite technician troubleshooting equipment and can have access to only external articles 130.

The filtered set of articles are provided to the user (308). The user can receive the set of filtered articles as recommended articles 134. The recommended articles 134 can be provided to the user 125, for example, in an electronic communication (e.g., email, text/SMS, website, application environment), as a possible solution to the user's query 127. The recommended articles 134 can be provided to the user 125 as a resolution to the user's query 127 or as a supplement to human-expert IT support. For example, the recommended articles 134 can be provided to the user 125 while the user 125 is waiting to receive service from an IT support expert (e.g., "You might want to check out these articles while you wait for our IT expert to get back to you").

In some implementations, the user 125 can provide feedback to the neural networks 106 related to an effectiveness and/or satisfaction with the recommended articles 134 in resolving query 127. The neural networks 106 can receive user feedback and incorporate the received feedback as IT support data 118 into a re-training process of the neural network 106. For example, if a user 125 indicates that a particular recommended article 134 did not resolve the problem defined by query 127, the neural network 106 may reduce a relative score of the embedded vector of the particular recommended article 134 for the problem.

The extended support content system 102 can be used to provide enhanced IT support to users of a home monitoring system. Users can include support technicians providing installation, maintenance, and/or repair services, home owners, or the like. The home monitoring system can include multiple different devices, sub-systems, apparatus, and the like, all of which can require maintenance and/or troubleshooting. An example of a home monitoring system is described below with reference to FIG. 4.

Figure 4:
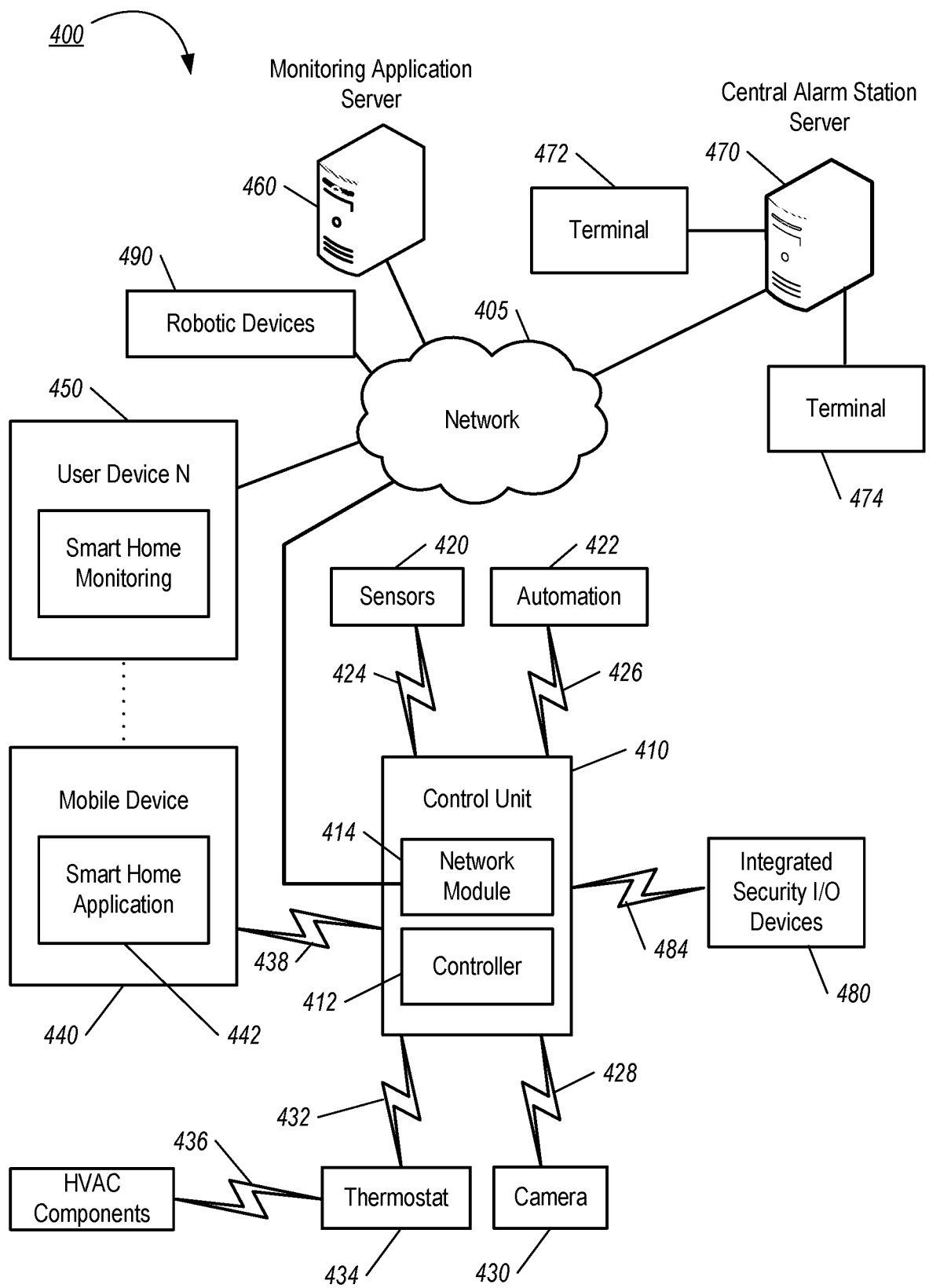
FIG. 4 is a diagram illustrating an example of a home monitoring system.

FIG. 4 is a diagram illustrating an example of a home monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 416 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system. For example, one or more of the sensors 420, the home automation controls 422, the camera 430, the thermostat 434, and the integrated security devices 480 can collect data related to a resident including location information (e.g., if the resident is home or is not home) and provide location information.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 440) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    collecting, for each support event of a plurality of support events, support data generated during the support event comprising two or more articles of a corpus of articles referenced during the support event;
    identifying, within the corpus of articles, (i) one or more of articles referenced in the support data and (ii) one or more articles not referenced in the support data;
    generating a plurality of embedded vectors that a) includes one or more referenced embedded vectors and one or more unreferenced embedded vectors and b) each comprise a mapping from discrete objects comprising words to vectors of real numbers, the generating comprising:
        generating, for each of the one or more articles of the corpus of articles that is referenced in the support data, a respective referenced embedded vector from the article and a subset of the support data (a) generated during the support event and (b) that references the article; and
        generating, for each of the one or more articles of the corpus of articles that is not referenced by the support data, a respective unreferenced embedded vector from only the article without using data from the support data generated during the support event,
        wherein a first embedded vector in the plurality of embedded vectors has a first dimensionality that is different from a second dimensionality of a second embedded vector in the plurality of embedded vectors;
    reducing a dimensionality of one or more embedded vectors from the plurality of embedded vectors so that each of the embedded vectors in the plurality of embedded vectors has the same dimensionality;
    training, using the plurality of embedded vectors that each have the same dimensionality, a neural network to select a particular article of the corpus of articles responsive to a new support event; and
    providing, to one or more computers, the trained neural network for use in selecting the particular article of the corpus of articles responsive to the new support event.

2. The method of claim 1, wherein the one or more articles of the corpus of articles are referenced by a human expert during the support event.

3. The method of claim 2, wherein the support data further comprises structured data provided by the human expert during the support event.

4. The method of claim 2, wherein a particular embedded vector corresponds to the one or more articles of the corpus of articles utilized by the human expert to provide a solution responsive to a particular problem query.

5. The method of claim 1, wherein training the neural networks further comprises providing a plurality of problem queries that each correspond to a respective embedded vector of the plurality of embedded vectors.

6. The method of claim 5, wherein training the neural networks comprises minimizing an angle between an output vector generated for a respective problem query and the respective embedded vector of the plurality of embedded vectors.

7. The method of claim 1, wherein generating the respective referenced embedded vector comprises using term frequency-inverse document frequency (TF-IDF) to generate the respective referenced embedded vector by extracting, from the article and the subset of the support data referencing the article, structured data to create a dictionary of words appearing in the structured data.

8. The method of claim 7, wherein generating the respective referenced embedded vector further comprises:
    selecting a set of words from the dictionary of words appearing in the structured data that appear in the structured data at a frequency below a threshold frequency with respect to structured data extracted from the corpus of articles and plurality of support data referencing the corpus of articles; and
    assigning respective word scores for each word of the set of words based on a frequency that the word appears in the article relative to the corpus of articles.

9. The method of claim 8, wherein reducing the dimensionality of one or more embedded vectors from the plurality of embedded vectors uses principal component analysis.

10. The method of claim 1, comprising:
    maintaining, for an entity, i) the corpus of articles that comprises internal articles and external articles and ii) a plurality of user accounts including one or more internal accounts and one or more external accounts, wherein:

the internal articles are a) accessible only by the one or more internal accounts and b) only referenced by at least some support data generated for the entity;

the external articles are a) accessible by both the one or more internal accounts and the one or more external accounts and b) referenced by data other than support data generated for the entity; and generating the plurality of embedded vectors comprises:
generating a first embedded vector for a first internal article from the internal articles; and
generating a second embedded vector for a second article from the external articles.

11. The method of claim 10, wherein providing the trained neural network for use in selecting the particular article of the corpus of articles responsive to the new support event comprises providing the trained neural network to a system to cause the system to use the trained neural network to select the particular article and another article from the corpus responsive to a query for an article from an external account from the one or more external accounts, determine that the external account has security credentials, and determine that the security credentials indicate that the external account is allowed to access the particular article given first security permissions for the particular article and should not access the other article given second security permissions for the other article, and provide the external account access to the particular article and not provide the external account access to the other article.

12. A system comprising:
one or more processors; and
at least one computer-readable storage medium couple to the one or more processors having stored thereon instructions which, when executed by the one or more processors, cause the one or more processors to perform operations comprising:
collecting, for each support event of a plurality of support events, support data generated during the support event comprising two or more articles of a corpus of articles referenced during the support event;
identifying, within the corpus of articles, (i) one or more of articles referenced in the support data and (ii) one or more articles not referenced in the support data;
generating a plurality of embedded vectors that a) includes one or more referenced embedded vectors and one or more unreferenced embedded vectors and b) each comprise a mapping from discrete objects comprising words to vectors of real numbers, the generating comprising:
generating, for each of the one or more articles of the corpus of articles that is referenced in the support data, a respective referenced embedded vector from the article and a subset of the support data (a) generated during the support event and (b) that references the article; and
generating, for each of the one or more articles of the corpus of articles that is not referenced by the support data, a respective unreferenced embedded vector from only the article without using data from the support data generated during the support event,
wherein a first embedded vector in the plurality of embedded vectors has a first dimensionality that is different from a second dimensionality of a second embedded vector in the plurality of embedded vectors;
reducing a dimensionality of one or more embedded vectors from the plurality of embedded vectors so that each of the embedded vectors in the plurality of embedded vectors has the same dimensionality;
training, using the plurality of embedded vectors that each have the same dimensionality, a neural network to select a particular article of the corpus of articles responsive to a new support event; and
providing, to one or more computers, the trained neural network for use in selecting the particular article of the corpus of articles responsive to the new support event.

13. The system of claim 12, wherein the one or more articles of the corpus of articles are referenced by a human expert during the support event.

14. The system of claim 13, wherein the support data further comprises structured data provided by the human expert during the support event.

15. The system of claim 13, wherein a particular embedded vector corresponds to the one or more articles of the corpus of articles utilized by the human expert to provide a solution responsive to a particular problem query.

16. The system of claim 12, wherein training the neural networks further comprises providing a plurality of problem queries that each correspond to a respective embedded vector of the plurality of embedded vectors.

17. The system of claim 16, wherein training the neural networks comprises minimizing an angle between an output vector generated for a respective problem query and the respective embedded vector of the plurality of embedded vectors.

18. The system of claim 12, wherein generating the respective referenced embedded vector comprises using term frequency-inverse document frequency (TF-IDF) to generate the respective referenced embedded vector by extracting, from the article and the subset of the support data referencing the article, structured data to create a dictionary of words appearing in the structured data.

19. The system of claim 18, wherein generating the respective referenced embedded vector further comprises:
selecting a set of words from the dictionary of words appearing in the structured data that appear in the structured data at a frequency below a threshold frequency with respect to structured data extracted from the corpus of articles and plurality of support data referencing the corpus of articles; and
assigning respective word scores for each word of the set of words based on a frequency that the word appears in the article relative to the corpus of articles.

20. A non-transitory computer storage medium encoded with a computer program, the program comprising instructions that when executed by a data processing apparatus cause the data processing apparatus to perform operations comprising:
collecting, for each support event of a plurality of support events, support data generated during the support event comprising two or more articles of a corpus of articles referenced during the support event;
identifying, within the corpus of articles, (i) one or more of articles referenced in the support data and (ii) one or more articles not referenced in the support data;
generating a plurality of embedded vectors that a) includes one or more referenced embedded vectors and one or more unreferenced embedded vectors and b) each comprise a mapping from discrete objects comprising words to vectors of real numbers, the generating comprising:

generating, for each of the one or more articles of the corpus of articles that is referenced in the support data, a respective referenced embedded vector from the article and a subset of the support data (a) generated during the support event and (b) that references the article; and generating, for each of the one or more articles of the corpus of articles that is not referenced by the support data, a respective unreferenced embedded vector from only the article without using data from the support data generated during the support event, wherein a first embedded vector in the plurality of embedded vectors has a first dimensionality that is different from a second dimensionality of a second embedded vector in the plurality of embedded vectors;

reducing a dimensionality of one or more embedded vectors from the plurality of embedded vectors so that each of the embedded vectors in the plurality of embedded vectors has the same dimensionality;

training, using the plurality of embedded vectors that each have the same dimensionality, a neural network to select a particular article of the corpus of articles responsive to a new support event; and providing, to one or more computers, the trained neural network for use in selecting the particular article of the corpus of articles responsive to the new support event.

\* \* \* \* \*